(12) United States Patent
Hodges et al.

(10) Patent No.: US 8,787,580 B2
(45) Date of Patent: Jul. 22, 2014

(54) DISTRIBUTION OF KEYS FOR ENCRYPTION/DECRYPTION

(75) Inventors: Stephen E. Hodges, Cambridge (GB); Kenneth R. Wood, Cambridge (GB); James Srinivasan, Cambridge (GB); Abigail Sellen, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1381 days.

(21) Appl. No.: 12/096,223

(22) PCT Filed: Nov. 24, 2006

(86) PCT No.: PCT/US2006/045369
§ 371 (c)(1),
(2), (4) Date: Oct. 21, 2008

(87) PCT Pub. No.: WO2007/067372
PCT Pub. Date: Jun. 14, 2007

(65) Prior Publication Data
US 2009/0220093 A1    Sep. 3, 2009

(30) Foreign Application Priority Data
Dec. 5, 2005    (EP) .................................. 05257465

(51) Int. Cl.
*H04L 29/06*    (2006.01)
*H04L 9/08*    (2006.01)

(52) U.S. Cl.
CPC .................................. *H04L 9/0819* (2013.01)
USPC ............................. 380/283; 380/277; 380/278

(58) Field of Classification Search
CPC .................................................... H04L 9/0819
USPC ............................................ 380/283, 277, 278
See application file for complete search history.

(56) References Cited

U.S. PATENT DOCUMENTS

| | | | |
|---|---|---|---|
| 4,200,770 A | 4/1980 | Hellman et al. | |
| 6,742,116 B1* | 5/2004 | Matsui et al. | 713/171 |
| 6,744,759 B1* | 6/2004 | Sidhu et al. | 370/356 |
| 6,795,429 B1* | 9/2004 | Schuster et al. | 370/352 |
| 6,851,053 B1* | 2/2005 | Liles et al. | 713/168 |
| 6,856,616 B1* | 2/2005 | Schuster et al. | 370/352 |
| 6,918,039 B1 | 7/2005 | Hind et al. | |
| 7,016,675 B1* | 3/2006 | Schuster et al. | 455/433 |

(Continued)

FOREIGN PATENT DOCUMENTS

| | | |
|---|---|---|
| DE | 3431726 A1 | 3/1986 |
| JP | 2005018487 A | 1/2005 |
| WO | WO02067548 A1 | 8/2002 |

OTHER PUBLICATIONS

Steer et al.; A secure audio teleconference system; Proceeding CRYPTO '88 Proceedings on Advances in cryptology, 1990, pp. 520-528, ACM Digital Library.*

(Continued)

*Primary Examiner* — Bradley Holder
(74) *Attorney, Agent, or Firm* — Pablo Tapia; Jim Ross; Micky Minhas

(57) ABSTRACT

Methods of encryption and decryption are described which use a key associated with an event to encrypt/decrypt data associated with the event. The method of encryption comprises identifying a key associated with an event and encrypting data using the identified key. The encrypted data is then published along with details of the event.

20 Claims, 8 Drawing Sheets

(56) References Cited

U.S. PATENT DOCUMENTS

| | | | |
|---|---|---|---|
| 7,716,482 B2* | 5/2010 | Jung et al. | 713/171 |
| 2001/0038695 A1* | 11/2001 | Kim | 380/283 |
| 2002/0068573 A1 | 6/2002 | Raverdy et al. | |
| 2002/0158904 A1 | 10/2002 | Gunter et al. | |
| 2004/0078595 A1* | 4/2004 | Kent et al. | 713/201 |
| 2004/0078596 A1* | 4/2004 | Kent et al. | 713/201 |
| 2004/0245331 A1* | 12/2004 | Vandewalle et al. | 235/380 |
| 2005/0084114 A1* | 4/2005 | Jung et al. | 380/278 |
| 2005/0125673 A1 | 6/2005 | Cheng et al. | |
| 2005/0192820 A1* | 9/2005 | Simon et al. | 705/1 |
| 2006/0085354 A1* | 4/2006 | Hirai | 705/59 |
| 2006/0095769 A1* | 5/2006 | Zuccherato et al. | 713/170 |
| 2006/0115085 A1* | 6/2006 | Iwamura | 380/259 |
| 2006/0117178 A1* | 6/2006 | Miyamoto et al. | 713/165 |
| 2006/0126843 A1* | 6/2006 | Brickell et al. | 380/260 |
| 2007/0061593 A1* | 3/2007 | Celikkan et al. | 713/189 |
| 2007/0081522 A1* | 4/2007 | Apelbaum | 370/352 |
| 2007/0083666 A1* | 4/2007 | Apelbaum | 709/231 |
| 2007/0115388 A1* | 5/2007 | Apelbaum | 348/430.1 |
| 2007/0288768 A1* | 12/2007 | Nesta et al. | 713/194 |

OTHER PUBLICATIONS

Hwang et al.; A self-encryption mechanism for authentication of roaming and teleconference services; Wireless Communications, IEEE Transactions on (vol. 2, Issue: 2) pp. 400-407; Mar. 2003; IEEE Xplore.*

FIPS PUB 197, "Advanced Encryption Standard (AES)", Nov. 26, 2001, p. 13-22.

Redwine, "A Logic for the Exclusion Basis System", IEEE Computer Society, Proceedings of the Hawaii International Conference on System Sciences (HICSS), 2004, pp. 1-6.

* cited by examiner

| Time | Keys Received by Each Device ■ | ● | ◆ | ▲ |
|---|---|---|---|---|
| a | 1001 | 3001 | 2001<br>3001 | |
| b | 1011 | 1011<br>3011 | 2011<br>3011 | 1011<br>2011 |
| c | 1021<br>2021<br>3021 | 1021<br>2021<br>3021 | 1021<br>2021<br>3021 | 1021<br>2021<br>3021 |

FIG. 8

DISTRIBUTION OF KEYS FOR ENCRYPTION/DECRYPTION

RELATED APPLICATIONS

This application is a National Stage of International Application No. PCT/US2006/045369, filed Nov. 24, 2006, which claims priority from European Patent Application No. 05257465.4, filed on Dec. 5, 2005. Both applications are incorporated herein by reference.

BACKGROUND

Over the last few years, the use of digital cameras has increased enormously, with digital cameras now commonly being incorporated into other portable electronic equipment, particularly mobile telephones. Over the same period, the resolution of those digital cameras has also increased considerably, with mobile telephones now having 2 Megapixel cameras integrated into them and digital cameras with upwards of 6 million effective pixels being widely available. Digital cameras allow users to take large numbers of photographs, knowing that they can be selective about which and how many images they may subsequently choose to print and/or retain. This results in a user having a large collection of digital images, where the file size for each image may be large.

SenseCam is a wearable camera developed by Microsoft Research which can be used to assist with memory recall by enabling a user to rewind through the recent events experienced by the wearer of the device. This may be particularly useful for memory-impaired individuals, or where an individual has experienced a traumatic event (e.g. an elderly person's fall resulting in injury). There are many other possible uses for SenseCam.

The device can capture very large numbers of images and in addition to capturing images, the device also records sensor data, such as movement, light level and temperature periodically. This sensor data is used to trigger the capturing of images, for example, when there is a change in light level or sudden movement. A change in light level may indicate that a user has moved from one room to another, or from inside to outside and therefore the image captured will indicate a change in location (and environment) of the wearer. The device has a wide angle or fish-eye lens so that the user does not need to worry about pointing the device in a particular direction. An accelerometer is used for image stabilisation.

Through use of a conventional digital camera or a SenseCam, a user may generate a huge collection of digital images that they may wish to distribute with others. The size of the image files coupled with typical internet connection speeds and mailbox size limits means that often it is not feasible to distribute more than a very select few images by email. Instead, images may be uploaded to a website where they can be viewed and downloaded by others. However, many people may be reluctant to publish collections of images, which may be of a personal event such as a holiday or birthday celebration, in such a publicly accessible manner.

One solution to this problem is to password protect the website and then to give the password to anyone who is permitted to view the images.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a method of encryption comprising the steps of: identifying a key associated with an event; encrypting data using the identified key; and publishing the encrypted data and details of the event.

Advantageously, by associating a key with an event, the access to the decrypted data can be limited to those attending the event. This enables the encrypted data to be published in a publicly accessible location whilst still controlling access to the decrypted data.

Preferably, the details of the event comprise at least one of: a date, a time, a day of a week, a location, an attendee list and an event name.

The method may further comprise the step of: transmitting the identified key using a wireless transmitter.

The transmitting step may be performed at the event. Advantageously, this communicates the key for the event to attendees at the event.

Preferably, the step of identifying a key comprises: at the event, receiving the key via a wireless receiver; and storing the key associated with the details of the event.

Advantageously, this allows an attendee at an event to use a key received at an event to encrypt data associated with that event.

The method may further comprise the step of: identifying at least one additional key associated with the event; and the step of encrypting may comprise: encrypting the data using the identified keys, such that the encrypted data can be decrypted using a subset of the identified keys.

In an example, the subset of the identified keys comprises all the identified keys.

Preferably, the step of publishing comprises: making the encrypted data and the details of the event available via at least one of: a website, a public folder, an email and a server.

Advantageously, this enables the encrypted data to be posted in a publicly available place over a large bandwidth connection.

Preferably, the step of encrypting comprises: selecting data comprising a plurality of parts; determining a sensitivity rating for each part of the data; and encoding those parts of the data having a sensitivity rating exceeding a predefined value, and preferably the step of publishing comprises: publishing the encrypted parts of the data, unencrypted parts of the data having a sensitivity below the predefined value and the details of the event.

Advantageously, this enables publication of less sensitive information without encryption and publication of more sensitive information with encryption. It only uses encryption where it is wanted and reduces the complexity of the publication of information.

Preferably, the data comprises at least one of: a digital photograph, a video clip and an audio clip.

A second example provides a computer program comprising computer program code means adapted to perform all the steps of any of the methods of encryption described above when said program is run on a computer.

The computer program may be embodied on a computer readable medium.

A third example provides a method of decryption comprising the steps of: accessing encrypted data and details of an event; identifying a key associated with the event; and decrypting the encrypted data using the identified key.

Advantageously, by associating a key with an event, the access to the key can be limited to those attending the event, such that only attendees can decrypt the data.

Preferably, the details of the event comprise at least one of: a date, a time, a day of a week, a location, an attendee list and an event name.

The method may further comprise the steps of: at the event, receiving the key via a wireless receiver; and storing the key associated with the details of the event, and the step of identifying a key may comprise: retrieving a stored key associated with the event.

The method may further comprise the step of: at the event, transmitting the identified key using a wireless transmitter.

The method may further comprise the step of: identifying at least one additional key associated with the event; and the step of decrypting may comprise: decrypting the data using at least one of the identified keys.

Preferably, the step of accessing comprises: retrieving the encrypted data and the details of the event from one of: a website, a public folder, an email and a server.

A fourth example provides a computer program comprising computer program code means adapted to perform all the steps of any of the methods of decryption described above when said program is run on a computer.

The computer program may be embodied on a computer readable medium.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 8 shows a table of the numbers received by each of the devices shown in FIG. 7.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In a situation where an individual wishes to share large amounts of data, such as a collection of digital photographs taken at an event, the individual can post the data to a web site which can be accessed by those at the event. However, where the data is personal (e.g. wedding photographs) or otherwise sensitive in nature, the individual may not wish to make the data available to all. To solve this, the individual could password protect either the data or access to the particular web site and then tell all those at the event the password required to access the material. However, this relies on the individual remembering to tell everyone and may be time consuming. Furthermore in some situations this may not be practical or possible. For example, the individual may not know all the other attendees at the event, (e.g. a wedding, a conference etc) and so may not be able to manually provide the password to all the other attendees. The examples detailed below describe improved methods and apparatus for sharing of keys that can be used to encrypt/decrypt data to be shared between the attendees of a particular event.

Figure 1:
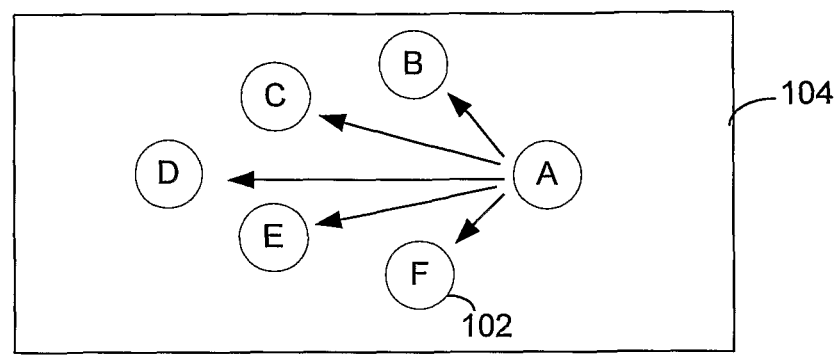
FIG. 1 is a schematic diagram of six individuals in a meeting room.
Figure 2:
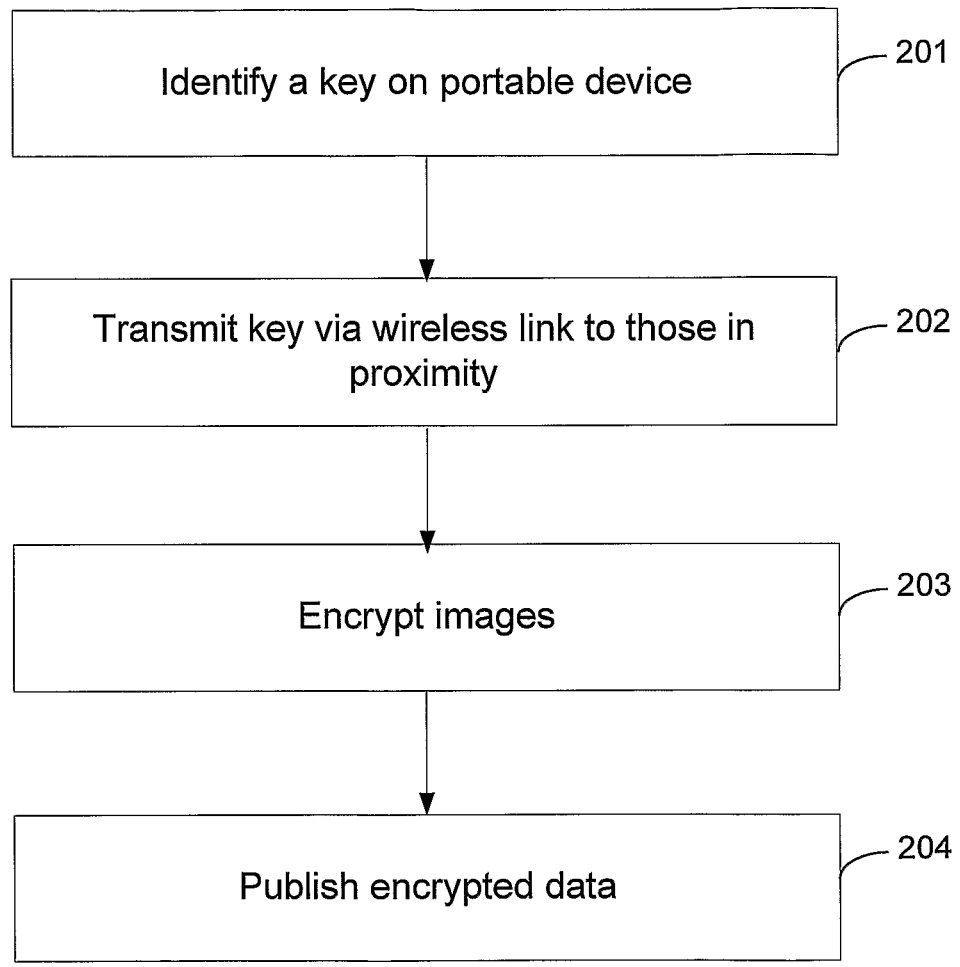
FIG. 2 is an example flow diagram for distribution of keys for encryption/decryption.

A first example can be described with reference to FIGS. 1-3. FIG. 1 is a schematic diagram of six individuals 102, labelled A-F, in a meeting room 104 and FIG. 2 shows an example flow diagram for distribution of keys for encryption/decryption. If meeting attendee A is wearing a SenseCam (as described above) he may wish to share the images taken during the meeting with the other five attendees (users B-F) but not with anyone who did not attend the meeting. An encryption key is identified (step 201) by the SenseCam device (e.g. by generating a key using a key generation program) and this encryption key is transmitted via a wireless link to wireless-capable devices carried by the other attendees (step 202). Examples of wireless-capable devices include mobile telephones, PDAs (personal digital assistants), laptop computers and SenseCams. Suitable wireless technologies include Bluetooth, infrared and WiFi. It may be beneficial to select a wireless technology for transmission of the key which has a range which is limited to the same as (or less than) the area of the event. In other examples, transmission methods with larger ranges may be used (see description below with reference to FIG. 7).

The term 'wireless' is used herein to mean a connection which does not involve a physical connection, i.e. a connection which is not 'wired'. It encompasses free space communication using any part of the electromagnetic spectrum including RF communication, infra-red communication and free space optical communication.

The images from the meeting are encrypted such that they can be decrypted using the distributed key (step 203). The images can then be distributed by posting them in an encrypted form in an accessible place (step 204), e.g. on a web page, a server or a public folder on a computer, or by sending them by email. Although the encrypted data may be accessed by many people, or in fact by anybody if they are posted on a public web site, the only people who can decrypt the data are the attendees A-F at the meeting who received the key at the meeting in question.

There may also be other materials, such as Microsoft Powerpoint (trade mark) presentations and minutes, that the meeting attendees also wish to share between those at the meeting and but not with anyone else. These materials can also be encrypted (by attendee A or by another attendee) such that they can be decrypted using the distributed key and then the encrypted data distributed in the same (or similar) manner as the images, described above.

In the example flow diagram shown in FIG. 2, the key is transmitted (in step 202) prior to the encoding of the images (in step 203). This is by way of example only and the steps could be performed in an alternative order or substantially simultaneously. By transmitting the key in advance of performing the encryption, as in FIG. 2, this allows the encryption step to be performed either on the camera device (i.e. on the SenseCam in this example) or subsequently on a computer once the images have been downloaded. Performing encryption on the camera is the most secure option because it means that the unencrypted images do not leave the camera and so there is less chance of them being disseminated or accessed by a third party. In another example, the identification and transmission of the key (steps 201 and 202) could be performed by a wireless-capable device other than the SenseCam and the encryption and publication steps (steps 203 and 204) could be performed on a computer.

In the above description with reference to FIG. 2, the key is described as being identified. This may comprise selection of the key from a list of keys that have previously been generated, generation of a key or any other suitable method to obtain a key. The key may be identified by generating a key either as part of the process of encrypting the data or by any other means.

Figure 3:
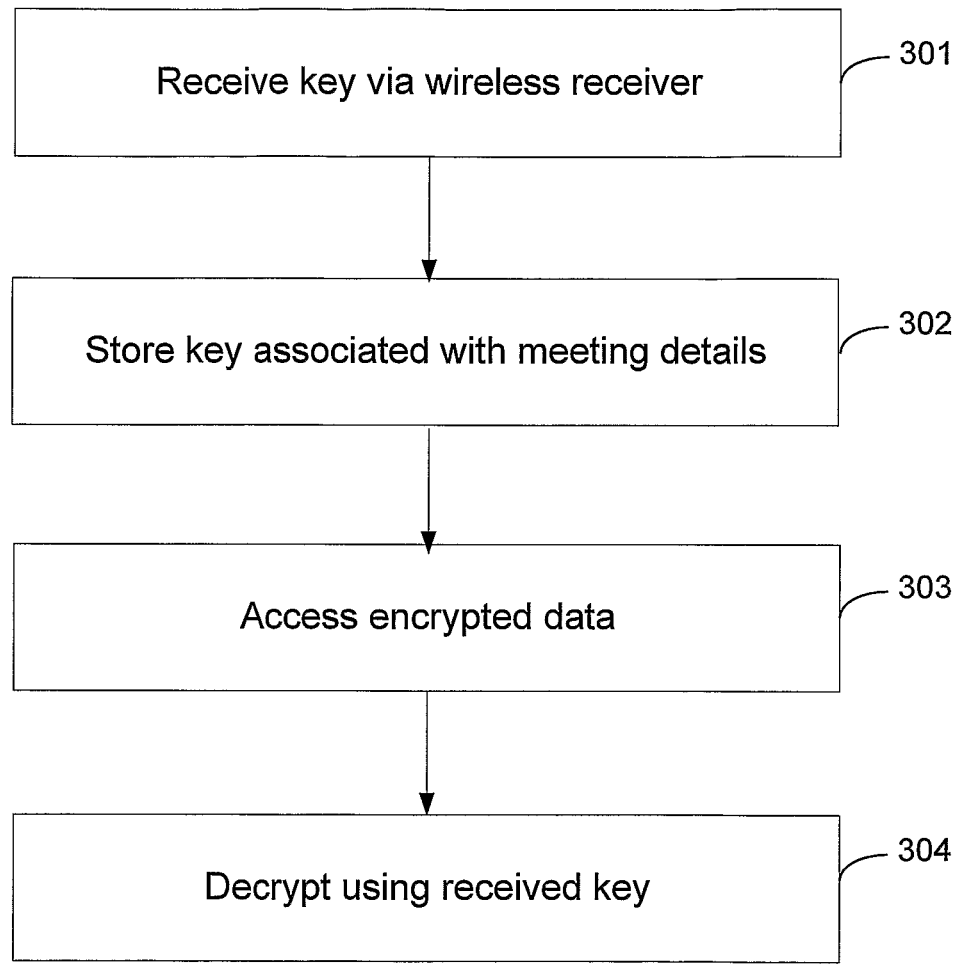
FIG. 3 is an example flow diagram of the decryption process performed by an attendee at an event.

FIG. 3 shows an example flow diagram of the decryption process performed by an attendee at the event, e.g. attendee B. Attendee B receives the key on a wireless-capable device, such as a PDA, which is equipped with a wireless receiver or transceiver (step 301). The key is then stored associated with details of the meeting (step 302). For example, the key may be stored in the calendar entry for the meeting or the key may be stored along with a time and date stamp (and location stamp if available) indicating when (and where, if known) the key was received. Subsequently, attendee B accesses the encrypted data associated with the meeting (step 303), e.g. by downloading the encrypted file from a web site, and then uses the stored key to decrypt the data (step 304).

In another example, in addition to receiving the key on a wireless-capable device whilst at an event, an attendee may also receive a pointer (e.g. a url) detailing where to find the encrypted data. The pointer may be transmitted by the same transmitter as the key or may be transmitted independently from the key.

Figure 4:
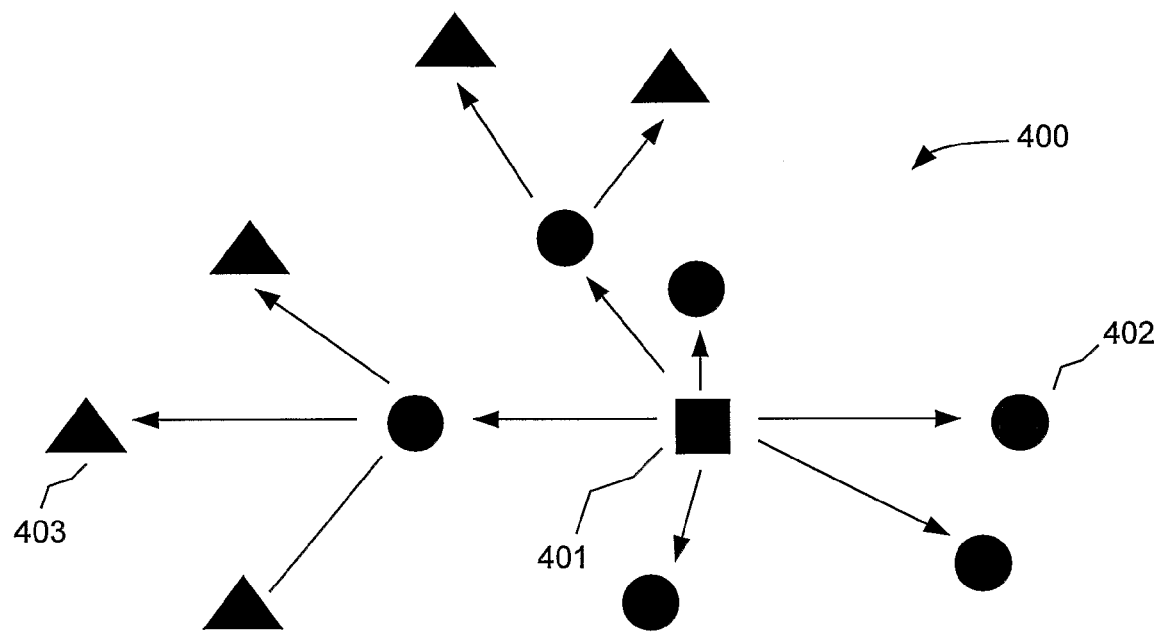
FIG. 4 shows a schematic diagram of group of people at an event.

In another example, the key transmitted at an event (e.g. the meeting as described above with reference to FIGS. 1 and 2) may be used in combination with a second key transmitted separately, for example, with the invitation to the event (e.g. within the Microsoft Outlook (trade mark) meeting invitation). In this example, the material to be disseminated to those at the event is encrypted in such a manner that both keys are required to be able to decrypt the data and an individual who has only one of the two keys cannot decrypt the data. This would prevent an individual from being able to access the data by eavesdropping on the key transmission whilst still limiting access to those individuals who actually attended the event.

Where data is to be disseminated to those attending a larger event, it may not be practical for one attendee to transmit the key from their wireless-capable device to each of the other attendees. Instead the wireless-capable devices may be used to relay the key to other attendees at the event as can be described with reference to FIG. 4. FIG. 4 shows a group of people 400 who may, for example, be attending a wedding. One person 401 (shown by the square symbol) has a digital camera and takes many pictures at the wedding that he knows he will want to share with all the other wedding guests after the event. Consequently, he causes a wireless-capable device of his, which may be his digital camera or other device, to identify and transmit a key using the device's wireless transmitter/transceiver. This key may be received by wireless-capable devices 402 (shown by the circle symbol) in close proximity to him but not necessarily received by all those at the event. The wireless-capable devices 402 which receive the key then re-transmit the key to other wireless-capable devices 403 (shown by the triangle symbol). Using an ad-hoc network technique, such as the one described, all the attendees at an event may receive the key even though the original sender of the key (person 401) does not know them all and may not have been in close proximity to all of them during the event.

In order to prevent widespread dissemination of the key using relaying, as described above, a limit may be set on the number of times a key can be re-transmitted. For example the key could be limited to only being retransmitted twice so that only people within three hops of the original sender 401 would be able to receive the key. In another example, the re-transmission could be limited in time such that re-transmission could occur for only the next hour or for the duration of the event and then would subsequently be prevented.

Figure 5:
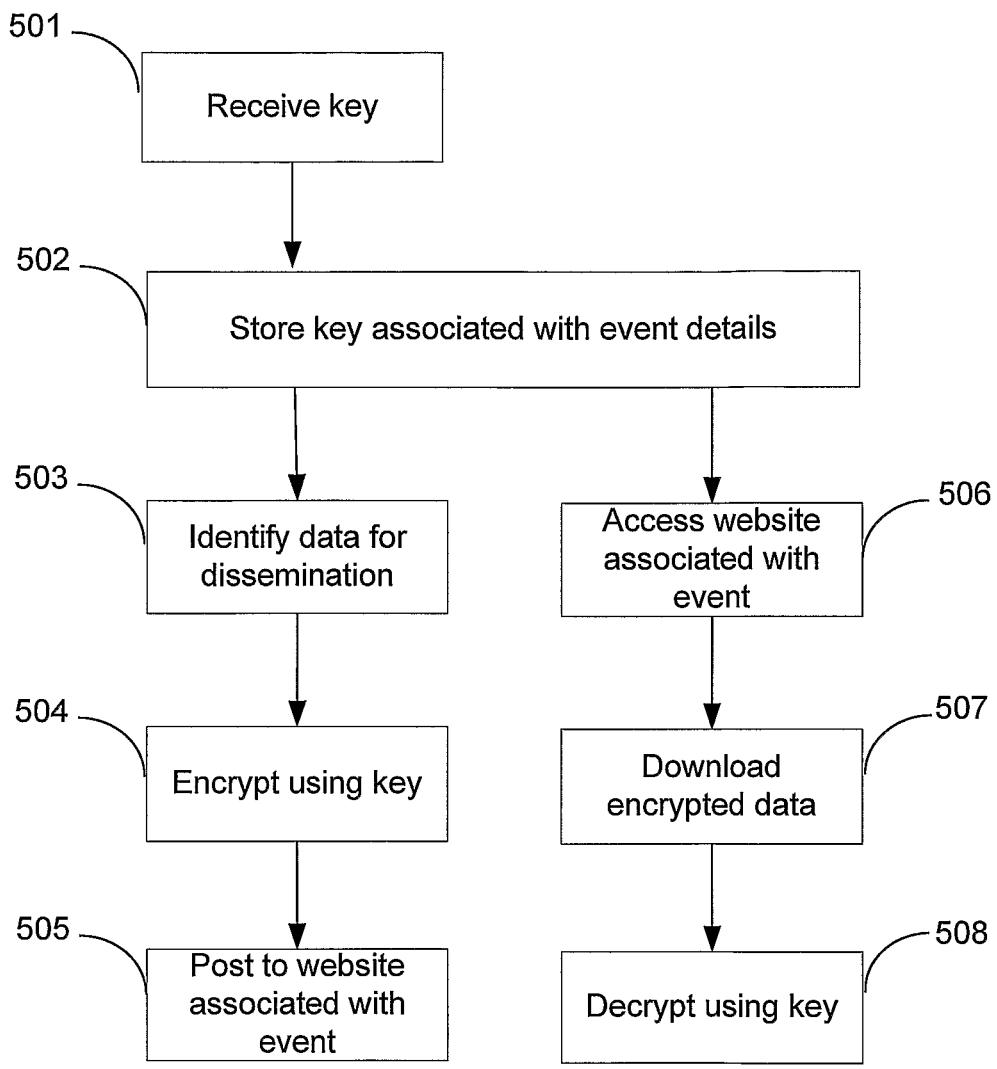
FIG. 5 is an example flow diagram of example encryption and decryption processes performed by an attendee at an event.

In the above description, the key was identified and transmitted by an attendee at an event with data that they wished to share with the rest of the attendees. In another example, the key could be transmitted by a local beacon which is not necessarily associated with either an attendee of the event or with an individual having data to share. For example, a conference (or other event) organiser may establish a local beacon that transmits a key for reception by conference participants. The local beacon may comprise a computer with wireless transmitting capability or other wireless transmitting apparatus. The use of the key by a conference participant can be explained with reference to FIG. 5. The key is received on a wireless-capable device (step 501) and stored associated with details of the event at which the key was received (step 502). If the participant has data to share with the other participants such as slides from a presentation or supplementary information in response to questions received, this data is identified (step 503) and then encrypted using the stored key (step 504). The encrypted data can then be posted to a web site (or other repository) associated with the event (step 505). If the participant wishes to access material associated with the event, they access the web site (step 506) and download the encrypted material (step 507) which can then be decrypted using the stored key (step 508).

In the above examples, a single key is transmitted at an event which is then used either on its own for encryption and decryption or is used in combination with one or more other keys which have been transmitted separately. However, in some circumstances it may be beneficial to control access to the data further such that only attendees who spent a certain period of time at an event can access the data. For example, a scientist may be prepared to share certain data to anyone at a technical conference but may only be prepared to share some details with attendees who sat through the whole of his presentation, (e.g. an audio transcript of his presentation). In another example, a conference organiser may only wish to provide information to attendees who attended the whole of a conference rather than those that turned up at registration but did not participate in any of the conference sessions. Such control over the dissemination of information may be achieved using multiple keys transmitted throughout an event, as can be described with reference to FIG. 6.

Figure 6:
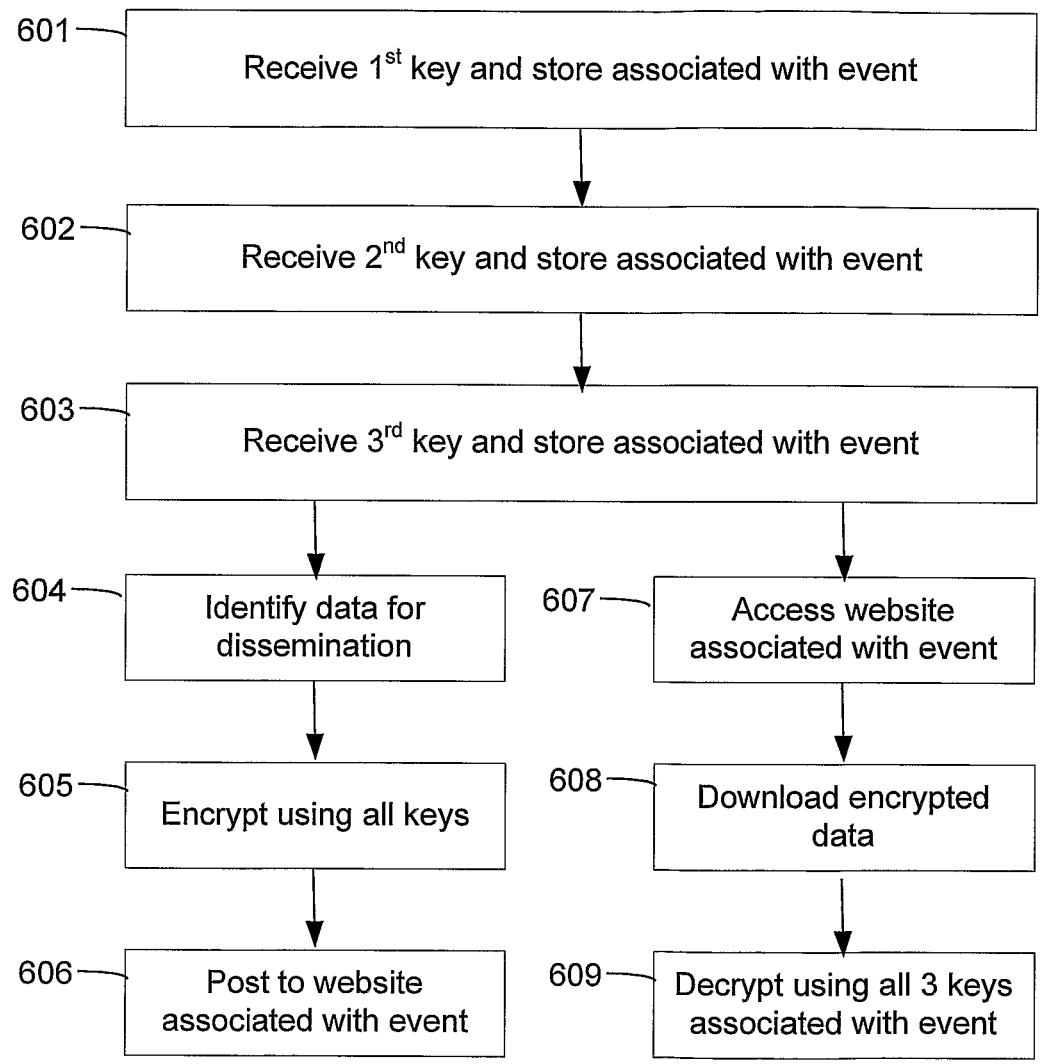
FIG. 6 shows an example flow diagram for use of multiple keys for encryption/decryption.

FIG. 6 shows an example flow diagram for use of multiple keys for encryption/decryption. Whilst attending an event, three different keys are received by a wireless-capable device carried by an attendee at different times throughout the event and each is stored on the device associated with the event (steps 601-603). When the individual subsequently wants to share information with other attendees, this information is identified (step 604) and the information is encrypted using one or more (all three in this case) keys associated with the event (step 605). The encrypted data can then be published on a web site associated with the event (step 606). If in addition or instead the individual wishes to access data posted by another attendee at the event, the web site is accessed (step 607) and the encrypted data downloaded (step 608) before being decoded using all the received keys stored associated with that event (step 609).

Although in the above description, the encrypted data is described as being posted to a web site or other repository associated with an event, this is by way of example only. The encrypted data could be stored anywhere, for example a conference participant could place an encrypted file containing his presentation at a particular conference on his home page, along with details of the conference at which the presentation was made. Anyone accessing the home page who had attended the conference and received the key(s) would then be able to download and decrypt the presentation but those who had not attended the conference would be unable to access the decrypted material.

In the above description with reference to FIGS. 1-6, the keys are transmitted by either a wireless-capable device belonging to an attendee or other transmitter associated with the event. In another example, which can be described with reference to FIGS. 7 and 8, the keys may be transmitted by transmitters which are not linked with the event.

Figure 7:
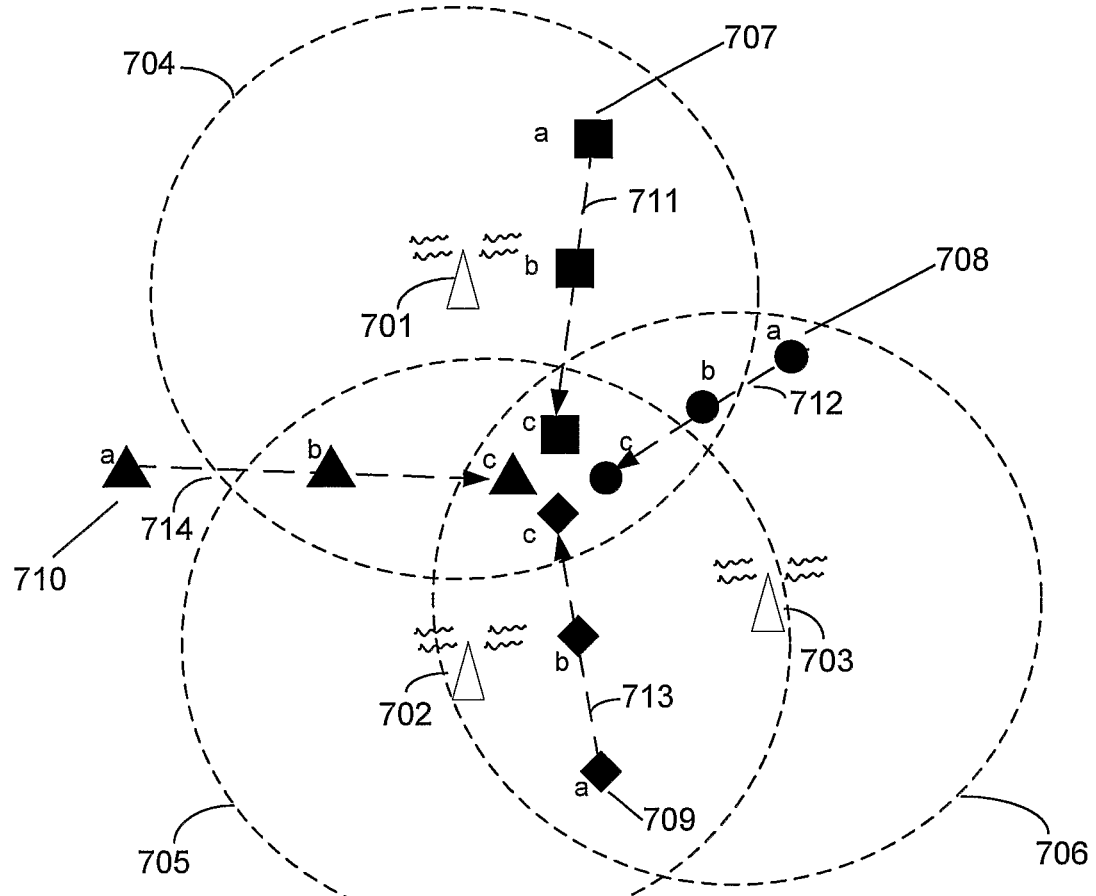
FIG. 7 shows a schematic diagram of three wireless transmitters and their coverage areas.

FIG. 7 shows a schematic diagram of three wireless transmitters 701-703 each having a particular coverage area 704-706. The transmitters may be GSM base stations, WiFi hotspots or other transmitters and the transmitters may be the same or may be different. Each transmitter regularly transmits a random number or other string and the numbers transmitted by each transmitter are different. The diagram also shows four wireless-capable devices 707-710, each carried by a different individual who is moving along a path (shown by dotted lines 711-714). Each device is shown in three positions, at times a, b and c, which coincide with times that numbers are transmitted by each of the transmitters 701-703. For purposes of explanation only, the first transmitter 701 transmits numbers 1001, 1011, 1021 at times a, b and c respectively, whilst the second transmitter 702 transmits 2001, 2011, 2021 and the third transmitter 703 transmits 3001, 3011, 3021.

As each device moves along its respective path, it receives the numbers transmitted by those transmitters that the device is within range of and these numbers are stored on the device associated with the time at which they are received. As each device moves along a different path, the sets of numbers received and stored for each device will be different. FIG. 8 shows a table of the numbers received by each of the devices 707-710 at each of the times a, b and c. At time c all the devices are within close proximity of each other and are all within range of the same transmitters. Consequently at this time, each device receives the same three numbers, 1021, 2021, and 3021.

If at time c, the four individuals carrying the four devices 707-710 meet and subsequently wish to share some data, this data may be encrypted, and subsequently decrypted using some or all of the keys received by the devices and stored associated with the time that the meeting took place. This means that only those devices that were in the correct location, at the correct time have the required keys to access the data.

The transmitters shown in FIG. 7 may transmit the numbers using any wireless technology or protocol. The transmitters may be land based (e.g. GSM base stations) or may be satellites. Depending on the coverage area of the transmitters, the set of keys recorded by any device may identify its location very precisely (e.g. for WiFi transmitters where the coverage area is very small) or very approximately (e.g. for GPS satellites where the coverage area is extremely large).

In some situations, particularly where the number of numbers recorded during an event may be very large or where the event covers a significant area so that different individuals may have received a slightly different set of numbers, it may be beneficial to use a modification to threshold encryption for the encryption of the data. Threshold encryption uses a key that is distributed amongst n decryption servers. A person with an encrypted message (a ciphertext) that they wish to decrypt has to send the ciphertext to at least k decryption servers, (where k<n), each of which provides a partial decryption share. The person can then combine the received partial decryption shares and as long as they have at least k shares they can recover the original message. The concept behind threshold encryption is that no one person (or server) has the entire encryption key and that the decryption can only occur when there is collaboration between a minimum number (k) of these people (or servers).

In this example, however, a single device has several keys that it has received and stored, either at a single time or over a period of time. By using threshold encryption techniques the data can be encoded such that an individual that has received and stored a subset k of all the n transmitted keys can still recover the original data and it does not matter which subset of k from n keys have been received.

These threshold encryption techniques may also be applied where several individuals generate keys associated with a single event. For example, a number of people at a wedding may take digital photographs and knowing that they will wish to share the photographs after the event, each generates a key and transmits it to other guests (as described above with reference to FIG. 4). A guest at the wedding may therefore receive a number of keys from other guests. If that guest then wishes to disseminate data associated with the wedding, they can encrypt the data using some or all of the keys that they have received or identified associated with the wedding, or they may encrypt it such that it can be decrypted using any subset k of the n keys that the encrypting guest had received.

The encryption techniques above may be combined with image analysis methods that are used to determine whether an image contains sensitive material. For example, an individual may have a large number of photographs taken on his holiday that he wishes to share with his friends. Some of the photographs are of panoramas, buildings and animals whilst some of the images contain faces or views of people. Image analysis methods may therefore be used to determine which images contain people (or parts thereof, such as faces) and only those images are encrypted when they are posted onto the central repository with the non-sensitive images being available to anyone. Other factors may be used in addition, or instead, to determine a sensitivity rating for data, for example, keywords may be defined which determine the sensitivity of a document to be shared. Data (or parts thereof) with a sensitivity rating which exceeds a predefined value (i.e. a threshold) may be encrypted, whilst data which does not may be left unencrypted. In another example, the encryption technique used may be selected according to the sensitivity rating. In another example, data (or parts thereof) with a sensitivity rating which exceeds a threshold may not be distributed at all, whilst data which has a sensitivity rating which does not exceed the threshold may be encrypted and distributed. In another example, multiple thresholds may be used to define data (or parts thereof) which cannot be distributed, data which can be distributed but only if encoded, and data which can be distributed without encoding. An example of a face detection algorithm is described in a paper by P. Viola and M. Jones entitled 'Robust Real-Time Object Detection' presented at the International Conference on Computer Vision (ICCV) 2001.

In another example, image recognition algorithms may be used to determine the sensitivity rating of images (e.g. still images, video clips etc). A 'black list' may be defined which contains the names of a number of people whose images should not be distributed. A 'grey list' may define those whose image may be distributed if encoded and a 'white list' may detail those who are happy for their image to be distributed freely without encoding.

Although the above methods are described as being carried out on a wireless-capable device, the method steps may be shared between one or more device. For example, the keys may be received and stored on a first device, such as an individual's mobile telephone, laptop or PDA. This information may then be transferred to or synchronised with a computer which may be used for the steps of encrypting/decrypting and accessing the data repository to upload or download data. The data to be shared may be created on the mobile telephone, camera, PDA, computer or other device, and the data may be created by the individual sharing the data or by a third party.

Although the above description relates primarily to the dissemination of digital images, the same techniques are also applicable to the sharing of any kind of data including, but not limited to, documents, presentations, audio files and video files.

The above description refers to the encryption of data using keys. The term 'encryption' is used herein to refer to any technique which can be used to prevent unauthorised access to data such that the data can only be accessed using one or more shared secrets (e.g. a key or a token). It is intended to cover both cryptographic techniques and authentication techniques. For example, the data may be shared in clear text but only to those holding the correct token. This token may be distributed using a wireless transmitter at an event (as described above). The data may be posted to a web site or other publicly accessible area in such a manner that it can only be retrieved upon presentation of the correct token. The term 'decryption' is used herein to refer to the process of accessing the original data using the one or more shared secrets.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A computer-implemented method of encryption comprising the steps of:
identifying a plurality of keys associated with an event, identifying the plurality of keys including:
at the event, receiving at least one key of the identified plurality of keys via a receiver; and
storing the at least one key of the identified plurality of keys, the at least one key of the identified plurality of keys being stored in association with details of the event;
executing, by a processor, machine readable instructions for encrypting data using the identified plurality of keys, the encrypted data being decryptable at one time using a subset of at least two keys of the identified plurality of keys, encrypting including:
selecting data comprising a plurality of parts;
determining a sensitivity rating for each part of the data; and
encrypting those parts of the data having a sensitivity rating exceeding a predefined value; and
publishing the encrypted data and the details of the event, publishing including:
publishing the encrypted parts of the data, unencrypted parts of the data having a sensitivity below the predefined value and the details of the event.

2. A method according to claim 1, wherein the details of the event comprise at least one of: a date, a time, a day of a week, a location, an attendee list or an event name.

3. A method according to claim 1, further comprising the step of:
transmitting at least one key of the identified plurality of keys using a wireless transmitter.

4. A method according to claim 3, wherein the step of transmitting the at least one key of the identified plurality of keys is performed at the event.

5. A method according to claim 1, wherein the receiver is a wireless receiver.

6. A method according to claim 1, wherein the subset of the identified plurality of keys comprises all the identified keys of the plurality of keys.

7. A method according to claim 1, wherein the step of publishing comprises:
making the encrypted data and the details of the event available via at least one of: a website, a public folder, an email or a server.

8. A method according to claim 1, wherein the data comprises at least one of: a digital photograph, a video clip or an audio clip.

9. A method according to claim 1, wherein the step of identifying the plurality of keys comprises receiving at least one key of the plurality of keys with an invitation to the event.

10. A system comprising:
one or more hardware processors configured to:
identify a plurality of keys associated with an event, identifying the plurality of keys including:
at the event, receiving at least one key of the identified plurality of keys via a receiver; and
storing the at least one key of the identified plurality of keys, the at least one key of the identified plurality of keys being stored in association with details of the event;
execute machine readable instructions for encrypting data using the identified plurality of keys, the encrypted data being decryptable at one time using a subset of at least two keys of the identified plurality of keys, encrypting including:
selecting data comprising a plurality of parts;
determining a sensitivity rating for each part of the data; and
encrypting those parts of the data having a sensitivity rating exceeding a predefined value; and
publish the encrypted data and the details of the event, publishing including:
publishing the encrypted parts of the data, unencrypted parts of the data having a sensitivity below the predefined value and the details of the event.

11. A system according to claim 10, wherein the details of the event comprise at least one of: a date, a time, a day of a week, a location, an attendee list or an event name.

12. A system according to claim 10, wherein the one or more processors are further configured to:
transmit at least one key of the identified plurality of keys using a wireless transmitter.

13. A system according to claim 12, wherein the one or more processors are configured to transmit the at least one key of the identified plurality of keys at the event.

14. A system according to claim 10, wherein the receiver is a wireless receiver.

15. A system according to claim 10, wherein the subset of the identified plurality of keys comprises all the identified keys of the plurality of keys.

16. A system according to claim 10, wherein the one or more processors are configured to make the encrypted data and the details of the event available via at least one of: a website, a public folder, an email or a server.

17. A system according to claim 10, wherein the data comprises at least one of: a digital photograph, a video clip or an audio clip.

18. A system according to claim 10, wherein the one or more processors are further configured to receive at least one key of the plurality of keys with an invitation to the event.

19. A computer storage medium, the computer storage medium being hardware and storing instructions that when executed by one or more processors cause the performance of actions including:
identifying a plurality of keys associated with an event, identifying the plurality of keys including:
at the event, receiving at least one key of the identified plurality of keys via a receiver; and
storing the at least one key of the identified plurality of keys, the at least one key of the identified plurality of keys being stored in association with details of the event;
executing, by a processor, machine readable instructions for encrypting data using the identified plurality of keys, the encrypted data being decryptable at one time using a subset of at least two keys of the identified plurality of keys, encrypting including:
selecting data comprising a plurality of parts;
determining a sensitivity rating for each part of the data; and
encrypting those parts of the data having a sensitivity rating exceeding a predefined value; and
publishing the encrypted data and the details of the event, publishing including:
publishing the encrypted parts of the data, unencrypted parts of the data having a sensitivity below the predefined value and the details of the event.

20. A computer storage medium according to claim 19, wherein the details of the event comprise at least one of: a date, a time, a day of a week, a location, an attendee list or an event name.

* * * * *